US006561908B1

(12) United States Patent
Hoke

(10) Patent No.: US 6,561,908 B1
(45) Date of Patent: May 13, 2003

(54) GAMING DEVICE WITH A METRONOME SYSTEM FOR INTERFACING SOUND RECORDINGS

(75) Inventor: Stephen J. Hoke, Reno, NV (US)

(73) Assignee: IGT, Reno, NV (US)

( * ) Notice: Subject to any disclaimer, the term of this patent is extended or adjusted under 35 U.S.C. 154(b) by 0 days.

(21) Appl. No.: 09/687,692

(22) Filed: Oct. 13, 2000

(51) Int. Cl.[7] .................... G06F 19/00

(52) U.S. Cl. .................... 463/35; 84/645; 84/651; 84/652

(58) Field of Search .................... 463/35; 84/645, 84/484, 651, 652; 381/61; 345/716

(56) References Cited

U.S. PATENT DOCUMENTS

| | | | | | |
|---|---|---|---|---|---|
| 4,300,225 | A | | 11/1981 | Lambl | 369/2 |
| 4,344,345 | A | | 8/1982 | Sano | 91/168 |
| 4,660,107 | A | * | 4/1987 | Chippendale, Jr. | 340/309.15 |
| 4,733,593 | A | | 3/1988 | Rothbart | 84/484 |
| 4,876,937 | A | | 10/1989 | Suzuki | 84/612 |
| 4,974,483 | A | | 12/1990 | Luzzatto | 117/84 |
| 5,221,801 | A | | 6/1993 | Bruti et al. | 84/661 |
| 5,258,574 | A | | 11/1993 | Kawano | 84/661 |
| 5,266,736 | A | * | 11/1993 | Saito | 84/484 |
| 5,430,835 | A | * | 7/1995 | Williams et al. | 707/500.1 |
| 5,472,197 | A | | 12/1995 | Gwiasda et al. | 273/143 R |
| 5,515,764 | A | | 5/1996 | Rosen | 84/484 |
| 5,703,310 | A | * | 12/1997 | Kurakake et al. | 84/609 |
| 5,792,972 | A | * | 8/1998 | Houston | 84/477 R |
| 5,892,171 | A | * | 4/1999 | Ide | 84/622 |
| 6,146,276 | A | * | 11/2000 | Okuniewicz | 273/142 B |
| 6,175,632 | B1 | * | 1/2001 | Marx | 381/56 |
| 6,309,301 | B1 | * | 10/2001 | Sano | 434/307 R |

FOREIGN PATENT DOCUMENTS

| | | | |
|---|---|---|---|
| JP | 411216221 | A | 8/1999 |
| JP | 02000296209 | A | 10/2000 |

OTHER PUBLICATIONS

The MIDI File Format, http://crystal.apana.org.au/ghansper/midi_introduction/midi_file_format.html, pp. 1–10.*

MIDI Media Adaption Layer for IEEE–1394, The MIDI Manufacturers Association, Nov. 30, 2000, pp. 1–17.*

* cited by examiner

*Primary Examiner*—Jessica Harrison
*Assistant Examiner*—Corbett B Coburn
(74) *Attorney, Agent, or Firm*—Bell, Boyd & Lloyd LLC

(57) ABSTRACT

The present invention involves a gaming device with a metronome system. The metronome system includes a CPU which reads game state data on ticks determined by a check-back rate. The CPU can cause sound file changes to occur at any time any tick occurs, thereby enabling a plurality of sound recordings to be interfaced on-beat or otherwise. The present invention provides gaming devices with enhanced sound and music capabilities, adding to a gaming device player's enjoyment and entertainment.

110 Claims, 9 Drawing Sheets

| | FLAG DATA | |
|---|---|---|
| SOUND-CAUSING EVENT | SOUND RECORDING | PLAY TIME |
| LOSING SELECTION | SINGLE EXPLOSION (B) | ON ANY BEAT |
| WIN VALUE | DING-DING-DING-DING (C) | ON BEAT 1 |
| THEME CHANGE | ♩ ♪ ♪ ♩ (D) | ON BEAT FOLLOWING BAR 1 |

GAMING DEVICE WITH A METRONOME SYSTEM FOR INTERFACING SOUND RECORDINGS

COPYRIGHT NOTICE

A portion of the disclosure of this patent document contains or may contain material which is subject to copyright protection. The copyright owner has no objection to the photocopy reproduction by anyone of the patent document or the patent disclosure in exactly the form it appears in the Patent and Trademark Office patent file or records, but otherwise reserves all copyright rights whatsoever.

DESCRIPTION

The present invention relates in general to a gaming device, and more particularly to a gaming device which includes a metronome system for interfacing a plurality of sound recordings.

BACKGROUND OF THE INVENTION

Contemporary gaming machines, such as slot machines, include a primary game and one or more bonus rounds. Typically, a bonus round begins when the player reaches a bonus triggering event in the primary game. In slot machines with reel-based primary games, the triggering event usually occurs when the player reaches a predetermined combination of symbols on the reels. Usually, the bonus scheme provides the player with an opportunity to gain a bonus value before the bonus round terminates.

Most of these gaming machines include computer systems which generate sounds and music at various times during the primary games and bonus rounds (at times referred to herein as "games"). The computer systems play various sound recordings when certain events occur in the games. A sound recording includes one or more sound effects and/or musical pieces. For example, often when the computer system is playing one musical piece, an event occurs, and the computer system switches to a different musical piece.

Switching sound recordings presents several problems. In the instant example, the game designer cannot control where the new musical piece will begin with respect to the current beat of the old musical piece. A typical result is an out-of-beat transition between the old piece of music and the new piece of music. In addition, game designers are unable to create sound schemes which involve multiple sound recordings which are played successively or together based upon a common timing system. Gaming machine sound schemes are consequently limited. To increase player enjoyment and excitement, it is desirable to provide players with new gaming machines with the capacity for more sophisticated sound schemes which involve the interface of multiple sound recordings.

SUMMARY OF THE INVENTION

The present invention overcomes the above shortcomings by providing a gaming device with a metronome system capable of interfacing different sound recordings on any tick of a regular, repeating interval. The term, interface, as used herein, includes switching, replacing combining, supplementing, splicing, overlaying or otherwise partially or wholly joining two or more sound recordings, temporarily or permanently.

In one embodiment, the metronome system of the present invention can be incorporated into a computer system of any gaming device which includes: a central processing unit (CPU); input and output devices; game read only memory (ROM); game random access memory (RAM); a sound card, including sound files and a sound processor; and a bus which enables all of these components to communicate. It should be appreciated that the metronome system can also be incorporated into other types of computer systems which do not include all of these components but which operate one or more gaming devices remotely.

In one embodiment of the metronome system of the present invention, the metronome system includes game code, music code and metronome code within the game ROM, and the game RAM includes metronome random access memory (RAM). The metronome RAM includes game state data, a check-back rate, beat count data and bar count data. The music code, which is preferably commercially available, is a set of instructions which the CPU uses to determine the type, duration and volume of tones to be played.

The metronome code is a set of instructions which the CPU uses to generate and store the game state data, check-back rate, beat count data and bar count data in the metronome RAM. The game state data is data which the CPU generates in response to particular sound-causing events which occur in the game. The CPU generates different data for each type of sound-causing event. For example, if a player makes a winning selection, the CPU may generate game state data specific to that sound-causing event. Preferably, the game state data includes data for the following sound-causing events: game start events, value-winning events, bonus triggering events, player selection events and game termination events. It should be appreciated, however, that the game state data can include data for other sound-causing events. The game state data also flags the CPU to conduct certain sound file changes, as described below.

The check-back rate is the component of the metronome system which plays the role of a physical metronome (a musical time-keeping device which marks time with ticks at regular intervals). The check-back rate is the rate at which the CPU checks or reads the game state data to detect the occurrence of sound-causing events. When the CPU makes such a reading, a tick or check-back (as referred to herein) is said to have occurred.

The check-back rate is preferably equal to the tempo of a sound recording. The tempo is the number of beats per second which occur in a sound recording. Therefore, if a sound recording had one beat per second, the CPU would read the game state data on every beat. In one embodiment, the CPU directs the sound card to switch two sound recordings in such a manner that the sound recordings are on-beat with one another. The check-back rate can, however, be set to any suitable rate, such that the CPU reads the game state data at subdivisions of beats or on a particular beat following a set of beats.

In musical terminology, it is common to refer to a set of beats as a measure bound by barlines or bars. A sound recording can consist of two or more measures which repeat in a loop. Each measure can be identified by the bar number at the beginning of the measure.

As will be discussed below, if the CPU reads the game state data on beats, there is a need to identify at which beat the CPU is reading the game state data. Similarly, there is a need to identify at which bar the CPU conducted its reading of the game state data. For this reason, the CPU generates beat count data and bar count data which is, in effect, a record of the current beat and bar being played.

In operation, the CPU preferably writes a predetermined check-back rate when a primary game or bonus round begins. However, it should be appreciated that the CPU can wait and write a -predetermined check-back rate after the primary game or bonus round begins. For example, the CPU can write a check-back rate at the same time the CPU begins to play a predetermined sound file (i.e., an entry musical piece for a game). In either case, the CPU preferably writes a check-back rate equal to the tempo of a sound recording. However, the metronome code can instruct the CPU to set the check-back rate to any other suitable rate.

Once the CPU writes a check-back rate, the CPU then reads the game state data at regular intervals or ticks determined by the check-back rate. The CPU also stores beat count data and bar count data each time the CPU reads the game state data. Once a sound-causing event occurs, the next time the CPU reads the game state data (i.e., on the next tick), the CPU will detect this event. The CPU then uses the metronome code to read the game state data for that particular event and then conduct specified sound file changes.

Preferably, the sound file changes include playing a different musical sound recording on the beat whereupon the CPU detected the sound-causing event, within a predetermined number of beats thereafter or on the beat following the upcoming bar. The sound file changes can also include stopping the current musical sound recording at the instant beat. For example, the game state data can instruct the CPU to make a file change on a particular beat in a particular measure (i.e., the first beat of bar one). Furthermore, the sound file changes can include increasing or decreasing the volume of the current musical sound recording. In addition to playing musical sound recordings, the sound file change can, instead, include playing a sound effect on any beat or bar, but preferably on the instant beat.

It should be appreciated that the metronome system of the present invention can be adapted to play a plurality of sound recordings simultaneously and when a sound-causing event occurs, to play a plurality of different sound recordings on beat with the earlier sound recordings or on any other tick whereupon the CPU reads the game state data.

The metronome system of the present invention provides gaming devices with the capacity to interface, change or switch sound recordings when certain game events occur, while making such change on a code-driven metronome tick. Preferably, the ticks correspond to the sound recording beats. In such case, using a predetermined check-back rate, the CPU of the metronome system detects sound-causing events and simultaneously plays a new sound recording on-beat with the initial recording. This type of invention provides gaming machine players with more interesting sounds and music and increases player enjoyment.

It is therefore an object of the present invention to provide a gaming device with a metronome system for interfacing sound recordings.

Other objects, features and advantages of the invention will be apparent from the following detailed disclosure, taken in conjunction with the accompanying sheets of drawings, wherein like numerals refer to like parts, elements, components, steps and processes.

DETAILED DESCRIPTION OF THE INVENTION

Gaming Device Structure

Figure 1A:
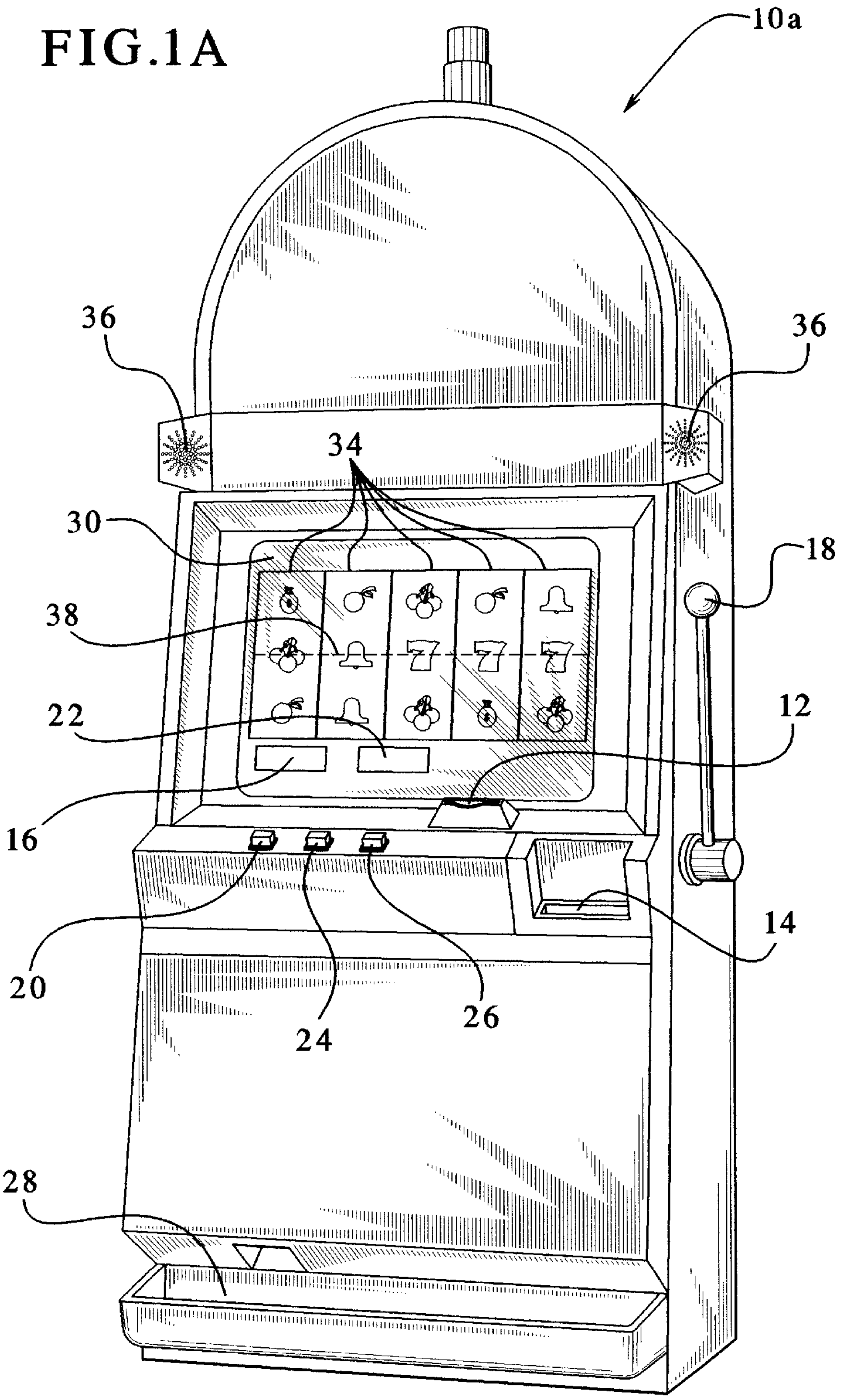
FIG. 1A is a perspective view of one embodiment of the gaming device structure of the present invention.
Figure 1B:
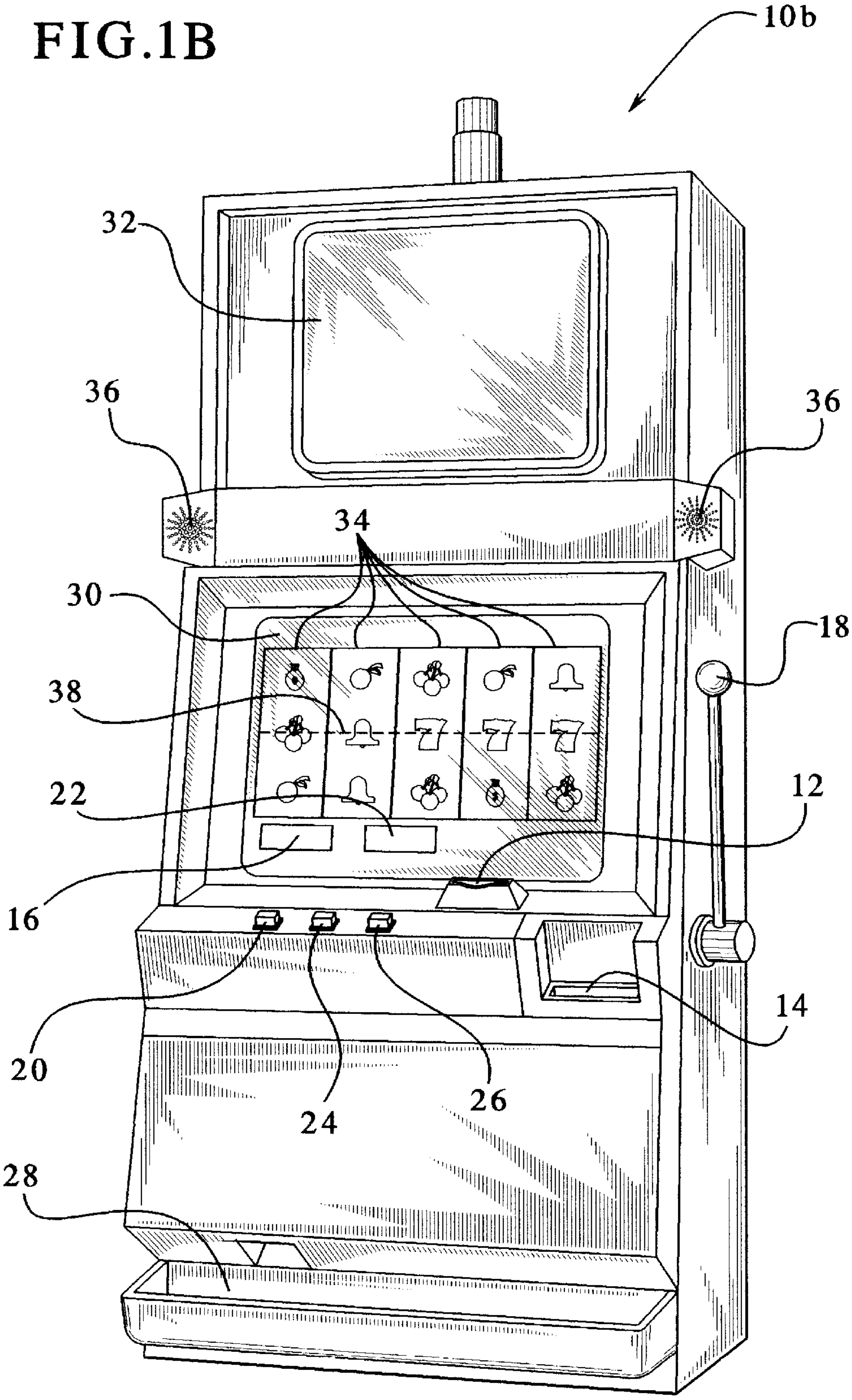
FIG. 1B is a perspective view of another embodiment of the gaming device structure of the present invention.

Referring now to the drawings, two embodiments of the gaming device of the present invention are illustrated in FIGS. 1A and 1B as gaming device 10*a* and gaming device 10*b*, respectively. Gaming device 10*a* and/or gaming device 10*b* are generally referred to herein as gaming device 10. Gaming device 10 is preferably a slot machine having the controls, displays and features of a conventional slot machine. It is constructed so that a player can operate it while standing or sitting, and gaming device 10 is preferably mounted on a console. However, it should be appreciated that gaming device 10 can be constructed as a pub-style table-top game (not shown) which a player can operate preferably while sifting. Furthermore, gaming device 10 can be constructed with varying cabinet and display designs, as illustrated by the designs shown in FIGS. 1A and 1B. Gaming device 10 can also be implemented as a program code stored in a detachable cartridge for operating a hand-held video game device. Also, gaming device 10 can be implemented as a program code stored on a disk or other memory device which a player can use in a desktop or laptop personal computer or other computerized platform.

Gaming device 10 can incorporate any primary game such as slot, poker or keno, any of their bonus triggering events and any of their bonus round games. The symbols and indicia used on and in gaming device 10 may be in mechanical, electrical or video form.

As illustrated in FIGS. 1A and 1B, gaming device 10 includes a coin slot 12 and bill acceptor 14 where the player inserts money, coins or tokens. The player can place coins in the coin slot 12 or paper money or ticket vouchers in the bill acceptor 14. Other devices could be used for accepting payment such as readers or validators for credit cards or debit cards. When a player inserts money in gaming device 10, a number of credits corresponding to the amount deposited is shown in a credit display 16. After depositing the appropriate amount of money, a player can begin the game by pulling arm 18 or pushing play button 20. Play button 20 can be any play activator used by the player which starts any game or sequence of events in the gaming device.

As shown in FIGS. 1A and 1B, gaming device 10 also includes a bet display 22 and a bet one button 24. The player places a bet by pushing the bet one button 24. The player can increase the bet by one credit each time the player pushes the bet one button 24. When the player pushes the bet one button 24, the number of credits shown in the credit display 16 decreases by one, and the number of credits shown in the bet display 22 increases by one.

At any time during the game, a player may "cash out"and thereby receive a number of coins corresponding to the number of remaining credits by pushing a cash out button 26. When the player "cashes out,"the player receives the coins in a coin payout tray 28. The gaming device 10 may employ other payout mechanisms such as credit slips redeemable by a cashier or electronically recordable cards which keep track of the player's credits.

Gaming device 10 also includes one or more display devices. The embodiment shown in FIG. 1A includes a central display device 30, and the alternative embodiment shown in FIG. 1B includes a central display device 30 as well as an upper display device 32. Gaming device 10 preferably displays a plurality of reels 34, preferably three to five reels 34 in mechanical or video form at one or more of the display devices. However, it should be appreciated that the display devices can display any visual representation or exhibition, including but not limited to movement of physical objects such as mechanical reels and wheels, dynamic lighting and video images. A display device can be any viewing surface such as glass, a video monitor or screen, a liquid crystal display or any other display mechanism. If the reels 34 are in video form, the display device for the video reels 34 is preferably a video monitor.

Each reel 34 displays a plurality of indicia such as bells, hearts, fruits, numbers, letters, bars or other images which preferably correspond to a theme associated with the gaming device 10. Furthermore, gaming device 10 preferably includes speakers 36 for making sounds or playing music.

With reference to FIGS. 1A and 1B, to operate the gaming device 10 in one embodiment the player must insert the appropriate amount of money or tokens at coin slot 12 or bill acceptor 14 and then pull the arm 18 or push the play button 20. The reels 34 will then begin to spin. Eventually, the reels 34 will come to a stop. As long as the player has credits remaining, the player can spin the reels 34 again. Depending upon where the reels 34 stop, the player may or may not win additional credits.

In addition to winning credits in this manner, preferably gaming device 10 also gives players the opportunity to win credits in a bonus round. This type of gaming device 10 will include a program which will automatically begin a bonus round when the player has achieved a qualifying condition in the game. This qualifying condition can be a particular arrangement of indicia on a display device. The gaming device 10 preferably uses a video-based central display device 30 to enable the player to play the bonus round. Preferably, the qualifying condition is a predetermined combination of indicia appearing on a plurality of reels 34. As illustrated in the five reel slot game shown in FIGS. 1A and 1B, the qualifying condition could be the number seven appearing on three adjacent reels 34 along a payline 38. It should be appreciated that the present invention can include one or more paylines, such as payline 38, wherein the paylines can be horizontal, diagonal or any combination thereof.

Metronome System

The gaming device of the present invention includes a metronome system embodied in one or more computer systems used to operate a gaming device. The metronome system includes a particular configuration of metronome-specific memory which can be incorporated into any computer system of any gaming device, including, but not limited to, systems which operate in gaming devices locally and systems which remotely operate one or more gaming devices through one or more networks.

Figure 2:
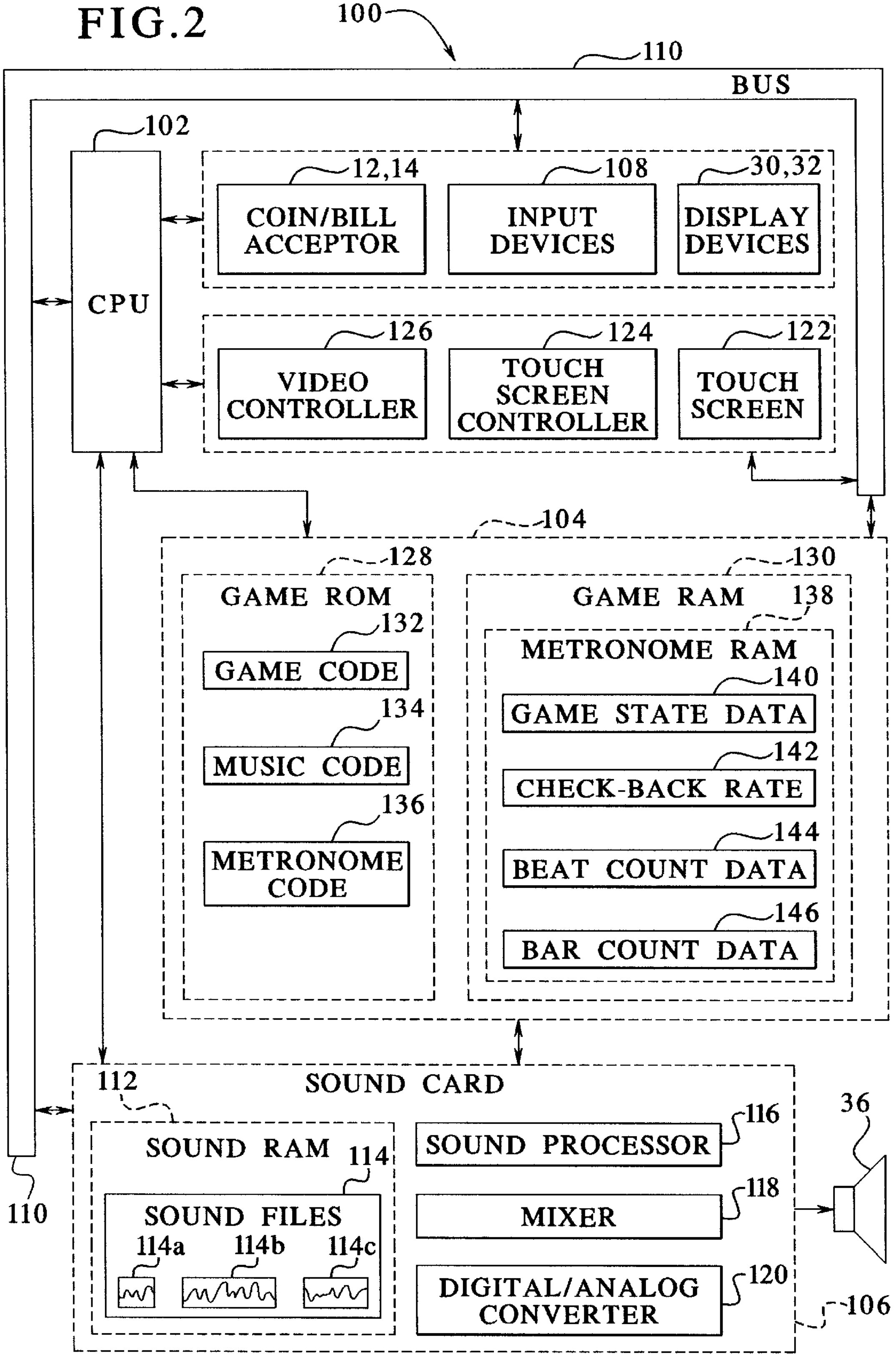
FIG. 2 is a schematic block diagram of the metronome system of one embodiment of the gaming device of the present invention.

One embodiment of the metronome system 100, illustrated in FIG. 2, includes: a central processing unit (CPU) 102; a memory device 104 for storing program code or other data; and a sound card 106. This embodiment also includes a coin slot 12 or bill acceptor 14; central display device 30; an upper display device 32; a plurality of speakers 36; and one or more input devices 108. All of these components electronically communicate with one another through a bus 110.

Sound card 106 includes sound random access memory (RAM) 112 which includes a plurality of sound files 114, identified as 114*a*, 114*b* and 114*c*. Sound files 114 can include any type of sound file readable by the CPU 102. Preferably, sound files 114 include digital wave files for musical sound recordings and sound effect recordings. In addition, sound card 106 includes a sound processor 116 which drives a mixer 118 and an analog to digital converter 120, thereby causing speakers 36 to generate sound. Mixer 118 enables the sound processor 116 to vary the volume of the sound recordings.

As illustrated in FIG. 2, the player preferably uses the input devices 108, such as pull arm 18, play button 20, the bet one button 24 and the cash out button 26 to input signals into gaming device 10. In certain instances it is preferable to use a touch screen 122 and an associated touch screen controller 124 instead of a conventional video monitor display device. Touch screen 122 and touch screen controller 124 are connected to a video controller 126 and CPU 102. A player can make decisions and input signals into the gaming device 10 by touching touch screen 122 at the appropriate places.

CPU 102 is preferably a microprocessor or microcontroller-based platform which is capable of displaying images, symbols and other indicia such as images of people, characters, places, things and faces of cards. The memory device 104, communicating with CPU 102, includes game read only memory (ROM) 128 and game random access memory (RAM) 130, which at times communicate with one another.

Game ROM 128 includes game code 132, music code 134 and metronome code 136. Game code 132 in turn includes instructions which control the gaming device 10 so that it plays a particular game in accordance with applicable game rules and pay tables. The music code 134 includes a set of instructions which the CPU uses to determine the type, duration, and volume of tones to be played. Preferably, the music code 134 is a commercially available code such as music instrument digital interface (MIDI).

The metronome code 136 includes instructions which direct the CPU 102 how to generate, store, interpret and use the data stored in metronome random access memory (RAM) 138. Metronome RAM 138, included within the game RAM 130, includes the following data: game state data 140; check-back rate 142; beat count data 144; and bar count data 146. Metronome RAM 138 temporarily stores all of this data in the form of buffer memory. It should be appreciated that the present invention ,can be adapted so that the metronome RAM 138 includes other types of data which relate to the characteristics of a sound recording or the characteristics or quality of a plurality of interfacing sound recordings.

The game state data 140 is data generated by the CPU 102 when a sound-causing event occurs in a game. Any predetermined event can be a sound-causing event. Preferably, a sound-causing event occurs when the game starts, a player gains value or loses value, a bonus round is triggered and when the game ends. Sound-causing events can also occur when the player makes a selection, activates an input device 108 or other activator, or makes an advancement or progress in a game or for any other reason. Each type of sound-causing event is associated with its own game state data 140 which includes flag data. The flag data flags or directs the CPU 102 to make a particular sound file change, as described in detail below.

Further describing the metronome RAM 138, the check-back rate 142 is the rate at which the CPU 102 checks or reads the game state data 140. The process of the CPU 102 reading the game state data 134 at regular intervals or ticks plays the role of a metronome instrument. A game designer can set the check-back rate 142 to any rate suitable for a particular sound scheme or sound file 114. For instance, if a sound recording has a tempo of one hundred twenty beats per minute, a game designer can set the check-back rate 142 to one check per one-half second. As a result, a CPU 102 reading, check-back or a tick would occur on each beat. The metronome system can be programmed such that game ROM 128 instructs the CPU 102 to use different check-back rates 142 for different sound files 114 which have different tempos.

The ticks can be used to interface one or more sound files 114 in any configuration determined by a game designer. Though it is preferred that the ticks coincide with the beats of a sound recording, the check-back rate 142 can be set such that a click occurs on a beat following a predetermined bar (i.e., at the beginning of a predetermined measure), on subdivisions of beats or on off-beats.

To keep track of upon which beat a tick occurs in a sound recording, CPU 102 generates beat count data 144 each time a tick occurs. The beat count data 144 indicates the current beat number. This enables the CPU 102 to start any sound recording on the beat coinciding with a tick.

Similady, the bar count data 144 enables the CPU 102 to start any sound recording on the beat following any bar, for instance at the beginning of the first measure. Most sound recordings include a set number of measures (i.e., two measures) which are repeated continuously in a loop. Though the number of beats per measure is constant, the notes or sounds made in each measure may vary. Therefore, the first measure can sound different from the second measure. For this reason, a game designer may decide to start a new sound recording at the beginning of the first measure instead of the second measure.

Figure 3:
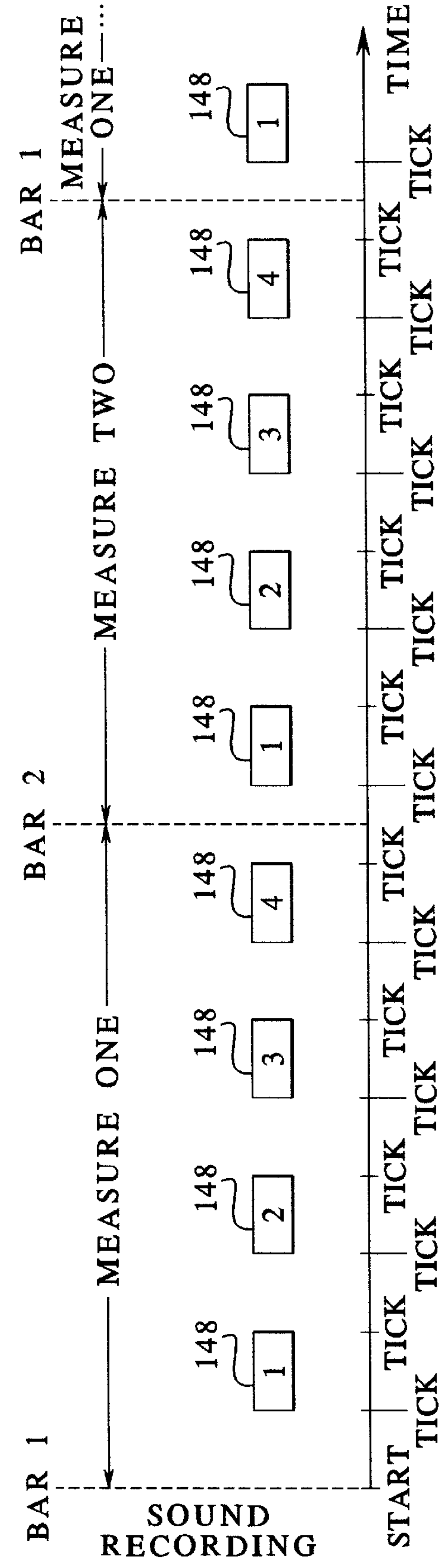
FIG. 3 is a graph of an example sound recording, bars, beats and measures in one embodiment of the present invention.

An example of a basic sound recording with has two measures is shown in FIG. 3. The bars shown as dotted lines are indicated as "BAR 1" and "BAR 2." The graph includes the entire two measures of the sound recording. FIG. 3 also shows the beginning of the loop of the sound recording (a repeat of measure one) for illustrative purposes. Each full measure includes four beats 148. As shown on the time line, a plurality of regular ticks, identified as "TICK" coincide with the beginning and ending of each beat 148.

Figure 4:
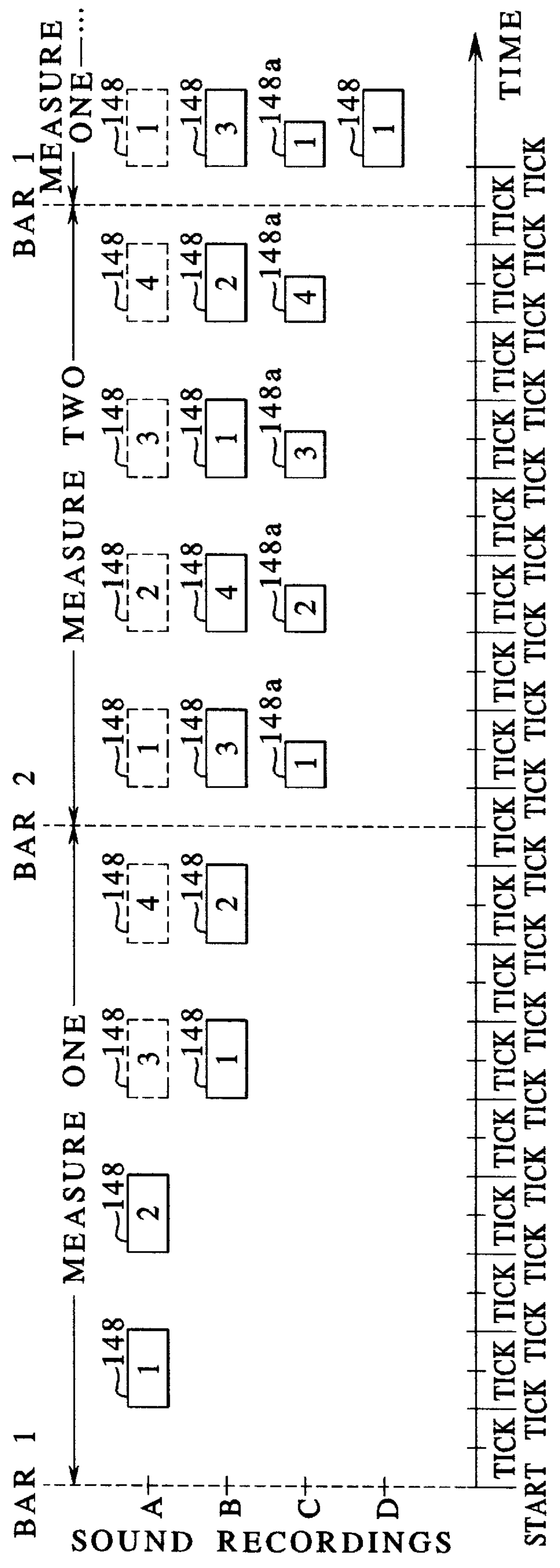
FIG. 4 is a graph of examples of various interfacing sound recordings, bars, beats and measures in one embodiment of the present invention.

This same sound recording is included in FIG. 4 as sound recording A. In the example shown in FIG. 4, sound recording A is the initial sound recording played by the gaming device. With this arrangement, if flagged to do so, the CPU 102 could cause the sound card to start a new four beat per measure sound recording at the beginning, middle or end of any beat 148.

For instance as shown in FIG. 4, the CPU 102 could start sound recording B at the beginning of the third beat in measure one of sound recording A. In addition, CPU 102 could start a sound recording C with beats 148a on the first beat following BAR 2. Here, beats 148*a* are one-half the duration of beats 148. Furthermore, as shown in FIG. 4, the CPU 102 could start a sound effect or musical recording D at the first beat following measure one (at the beginning of the first loop). Note that if a sound effect, the sound recording D consists of one beat, such as an explosion sound. In all of these examples shown in FIG. 4, the CPU 102 preferably stops sound recording A at a predetermined tick occurring after the CPU 102 started the new sound recording. Preferably CPU 102 reads certain game state data 140 associated with a particular sound file 114 which instructs the CPU 102 when to stop the old sound file. The stopping of sound recording A is generally indicated in FIG. 4 with beats 148 in dotted lines.

Figures 5A, 5B:
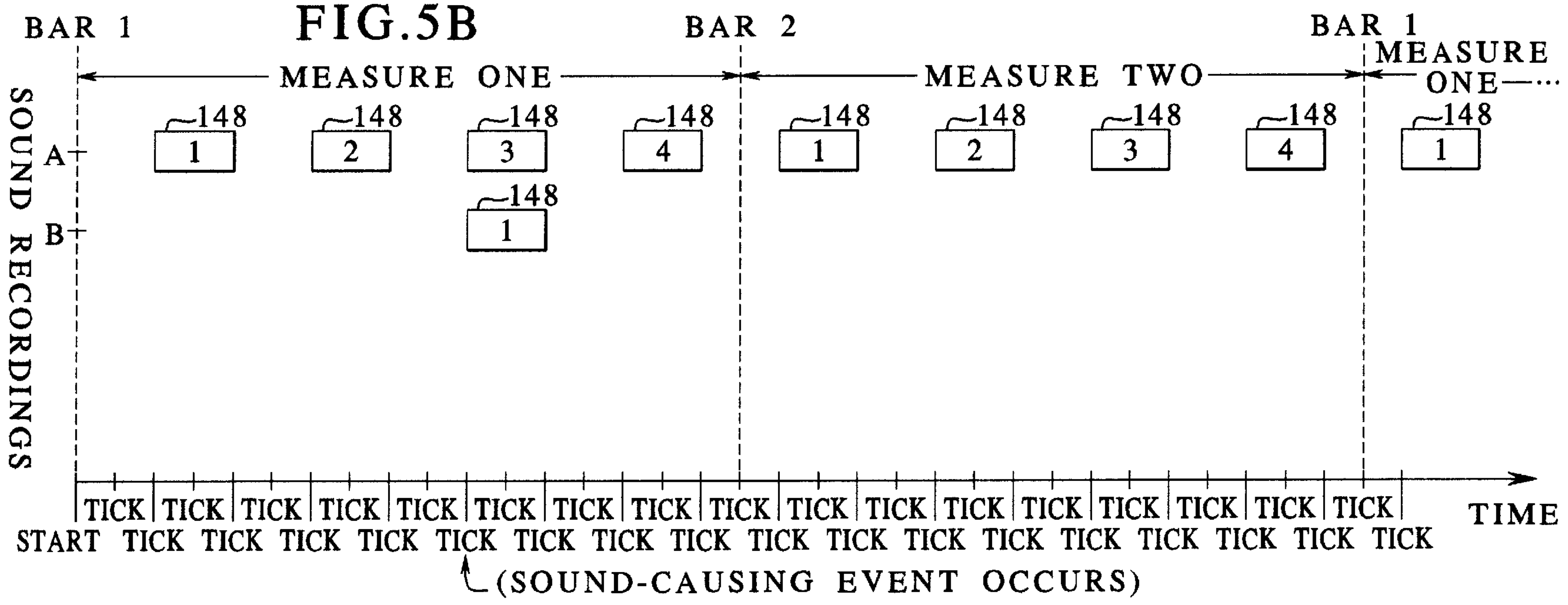
FIG. 5A is a table of example sound-causing events and corresponding flag data of one embodiment of the present invention.
FIGS. 5B through 5D are graphs of example sound recordings, bars, beats and measures in one embodiment of the present invention.

An example of a game with three sound-causing events and the corresponding flag data is shown in FIGS. 5A through 5D. As shown in FIG. 5A, each sound-causing event is associated with a sound recording and a play time. These specifications are preferably programmed into the metronome code. The first event is a losing selection, such as a player pushing a button and selecting a symbol that terminates the game. The losing selection event is associated with a single explosion sound-effect, identified as sound recording B. This sound-effect is played on any beat.

The second sound-causing event is the player winning a value. This event corresponds to a looped, ding-ding-ding-ding sound recording, identified as sound recording C. This sound recording is played on any beat one. Finally, the third sound-causing event is a theme change event, such as the player advancing from one screen to a different screen with a different graphical theme (i.e., football game graphics to baseball game graphics). The associated sound recording is the popular "Take Me Out to the Ball Game" song played on the beat following bar one, identified as sound recording D.

Figure 5C:
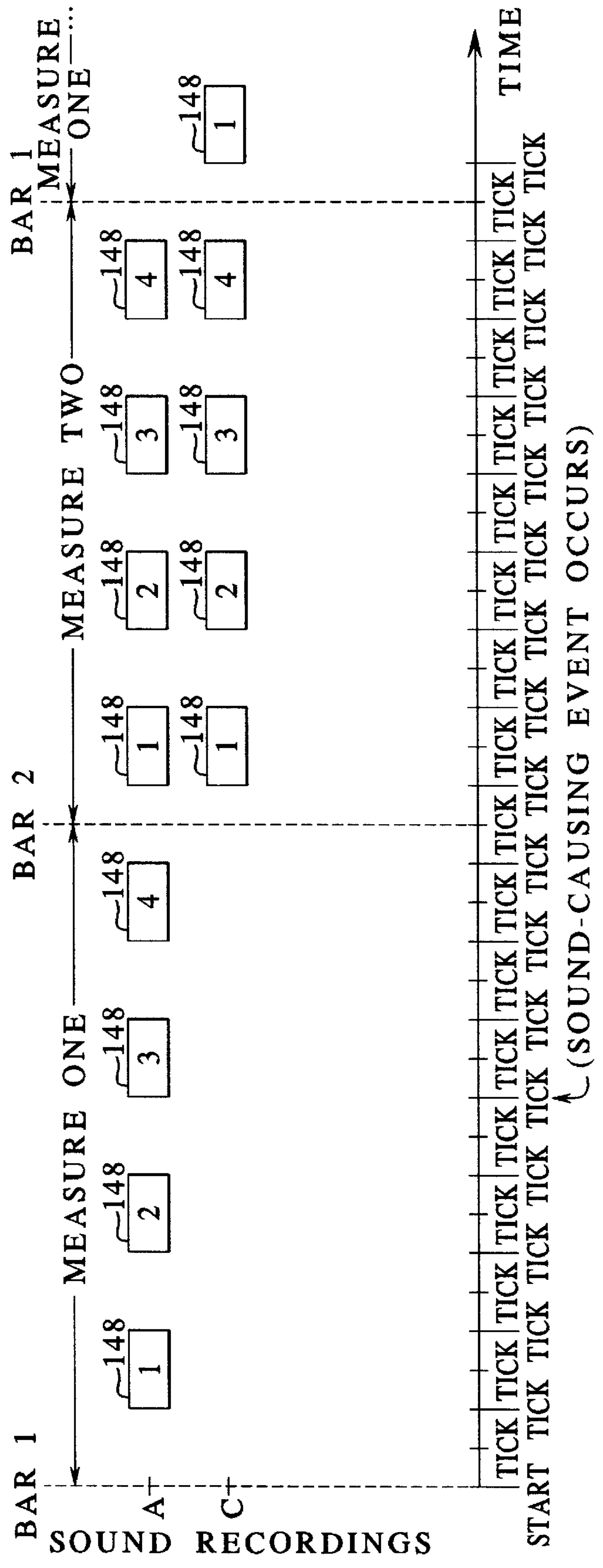
Figure 5D:
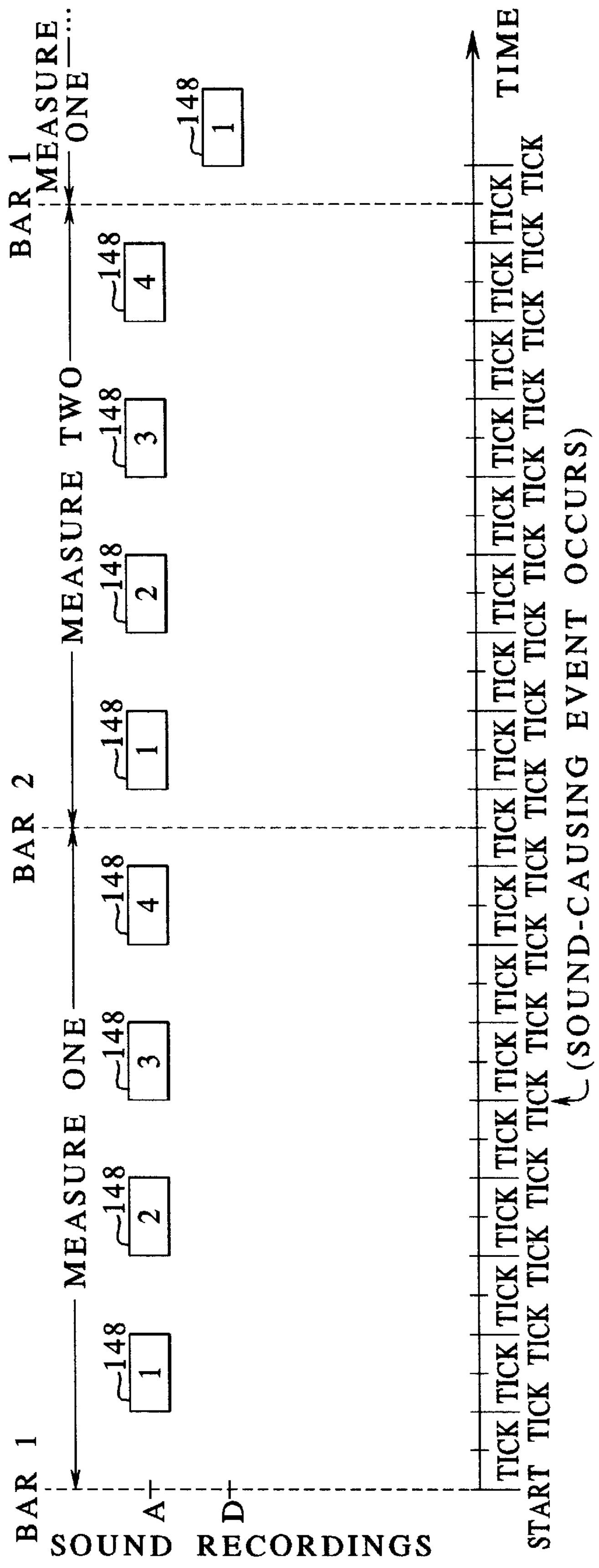

In FIGS. 5B through 5D, a graph illustrates the playing of sound recordings B, C and D. In these examples, the game is already playing sound recording A when a sound-causing event occurs. Also, the sound-causing events occur at the tick identified in each graph.

If a player makes a losing selection at the tick identified in FIG. 5B, the CPU 102 causes the sound card 106 to play the explosion sound-effect recording B on beat three of sound recording A. Sound recording A then continues to play. If a player wins a value at the tick identified in FIG. 5C, the CPU 102 causes the sound card 106 to play the ding-ding-ding-ding sound recording C on beat one in measure two of sound recording A. Preferably, sound recording A continues to play and the beats in measure two are faded out while sound recording C is played.

The theme change event is illustrated in FIG. 5D. In this example, sound recording A is a popular college football fight song, and sound recording D is the popular "Take Me Out To The Ball Game" baseball song. When the theme change event occurs at the tick identified in FIG. 5D, the CPU 102 waits until the first beat following bar one of sound recording A. At this point, the CPU 102 causes the sound card 106 to stop sound recording A and to start playing sound recording D. Though the examples used in FIGS. 5A through 5D and elsewhere in this specification include sound recordings with four beats per measure, it should be appreciated that the present invention can include sound recordings with any number of beats per measure.

Figure 6:
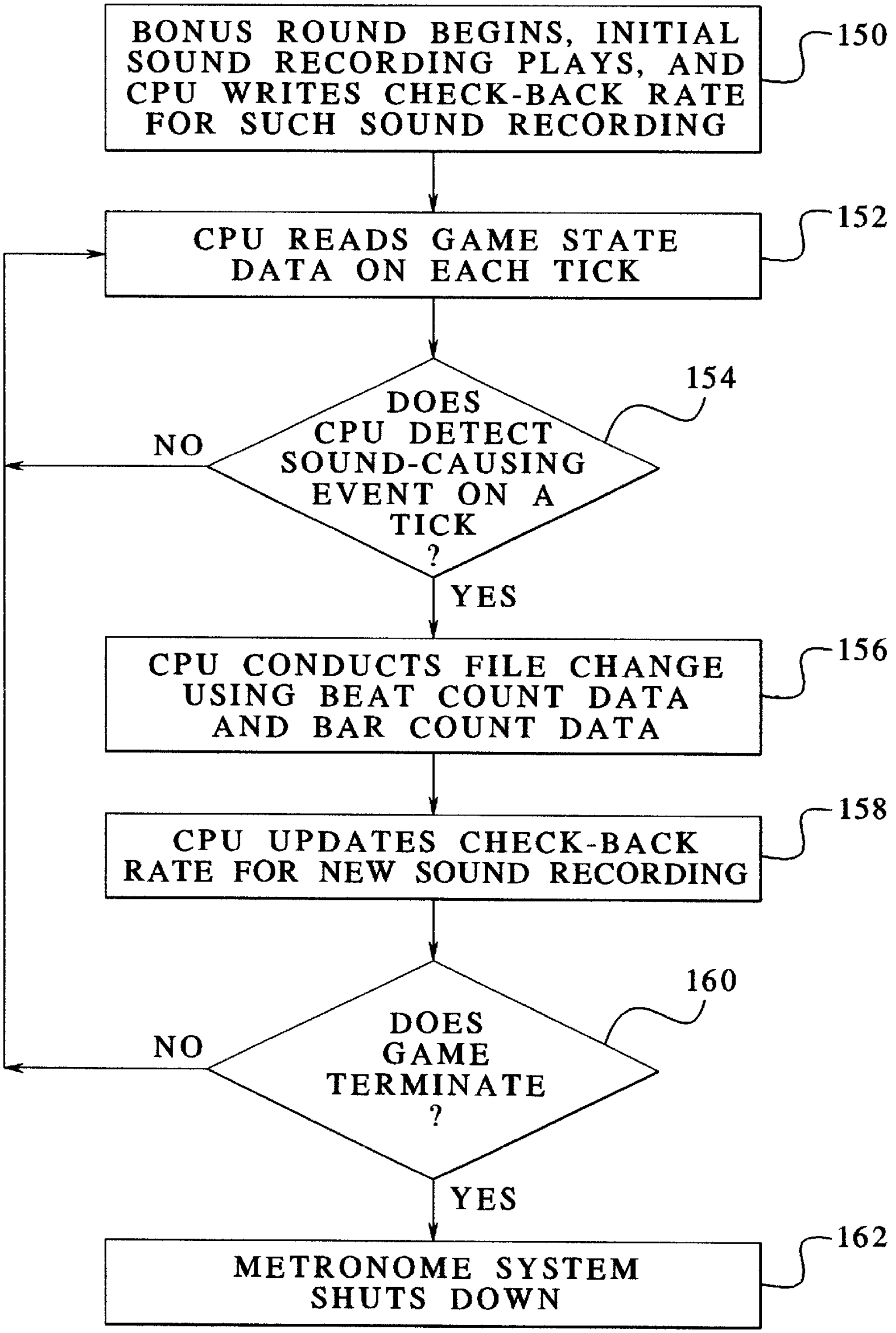
FIG. 6 is a flow diagram of one embodiment of the present invention.

As indicated by block 150 in FIG. 6, in operation of a preferred embodiment, when a player reaches a bonus triggering event, the CPU 102 instructs the sound card 106 to play a particular sound file 114, and the CPU 102 writes the check-back rate 142 associated with such sound file to the metronome RAM 138. As indicated by block 152, the CPU 102 then reads the game state data 140 for any sound-causing events, in regular intervals or clicks as specified by the check-back rate 142. If the CPU 102 detects a sound-causing event on a particular click as indicated by diamond 154, the CPU 102 conducts a sound file change as specified by flag data included in the game state data. As indicated by block 156, the CPU 102 uses the beat count data 144 and bar count data 146 to carry out this sound file change.

For example, the sound file change could be to play a particular sound file 114 immediately. If so, the CPU 102 will play the file on the same tick whereupon the CPU 102 detected the sound-causing event. In another example, the sound file change could also be to play a particular sound file 114 on the first beat following the first bar of a sound recording. In this case, the CPU 102 would wait and start the new sound file 114 on the tick corresponding to the specified beat.

Furthermore, as indicated by block 158, the CPU 102 then updates the check-back rate 142 with the rate specified in the game ROM 128 for the new sound file 114. If the game does not terminate, as indicated by diamond 160, the process of reading game state data on each tick repeats itself. If the game does terminate, and after the CPU 102 uses the sound card 106 to play any final sound recording, the metronome system shuts down along with the gaming device, as indicated by block 162.

Though various embodiments described herein involve the change or switch from a single sound recording to another, the metronome system of the present invention can be used to replace one or more sound recordings with one or more different sound recordings. Furthermore, the metronome system can be used to supplement or interface one or more sound recordings with one or more new sound recordings. All of these changes can be carried out on any predetermined tick of the metronome system.

It should be appreciated that although a CPU 102 and memory device 104 are preferable implementations of the present invention, the present invention can also be implemented using one or more application-specific integrated circuits (ASIC's) or other hard-wired devices, or using mechanical devices. Furthermore, although the CPU 102 and memory device 104 preferably reside on each gaming device 10 unit, it is possible to provide some or all of their functions at a central location such as a network server for communication to a playing station such as over a local area network (LAN), wide area network (WAN), Internet connection, microwave link, and the like.

The metronome system of the present invention includes a metronome-system which provides gaming devices with the capacity to interface one or more sound files with one or more new sound files. The sound file changes necessary to create the interfacing can occur on any predetermined tick of the metronome system. The metronome ticks preferably coincide with beats, ensuring that all sound file interfacing, such as switching, occurs on-beat. The metronome system of the present invention enhances the sophistication and quality of gaming device sound schemes and increases the entertainment and enjoyment experienced by gaming device players.

While the present invention has been described in connection with what is presently considered to be the most practical and preferred embodiments, it is to be understood that the invention is not limited to the disclosed embodiments, but on the contrary is intended to cover various modifications and equivalent arrangements included within the spirit and scope of the claims. It is thus to be understood that modifications and variations in the present invention may be made without departing from the novel aspects of this invention as defined in the claims, and that this application is to be limited only by the scope of the claims.

The invention is hereby claimed as follows:

1. A gaming device having a musical metronome system comprising:

data processing means;

at least one memory device connected to said data processing means, said memory device storing a first sound file and a second sound file, said first sound file and said second sound file each having at least one beat, and said memory device storing a check-back rate; and at least one speaker, in communication with the data processing means, which produces sound based on the first sound file and the second sound file;

whereby the data processing means causes the first sound file to be played, detects an event and uses the check-back rate to interface the second sound file and the first sound file on one of the beats of the first sound file.

2. The gaming device of claim 1, whereby the data processing means interfaces the second sound file and the first sound file on one of the beats of the first sound file when a predetermined event occurs.

3. The gaming device of claim 1, whereby the data processing means interfaces the second sound file and the first sound file on one of the beats of the first sound file after a predetermined event occurs.

4. The gaming device of claim 1, wherein the first sound file and the second sound file each have at least one tempo defined by a plurality of regularly occurring beats.

5. The gaming device of claim 4, wherein the check-back rate defines a plurality of regularly occurring check-backs which coincide with the regularly occurring beats associated with at least the first sound file.

6. The gaming device of claim 1, wherein the memory device includes game state data.

7. The gaming device of claim 6, wherein the game state data includes flag data.

8. The gaming device of claim 1, wherein the memory device includes beat count data.

9. The gaming device of claim 1, wherein the memory device includes bar count data.

10. The gaming device of claim 1, wherein the memory device includes music code.

11. The gaming device of claim 8, wherein the sound file change includes at least one bar specification.

12. The gaming device of claim 1, wherein the data processing means includes a central processing unit.

13. The gaming device of claim 1, wherein the data processing means includes at least one network.

14. The gaming device of claim 1, which includes a sound card adapted to communicate with the data processing means.

15. The gaming device of claim 1, which includes a sound processor adapted to communicate with the data processing means.

16. The gaming device of claim 1, which includes a mixer adapted to communicate with the data processing means.

17. The gaming device of claim 1, which includes a digital to analog converter adapted to communicate with the data processing means.

18. The gaming device of claim 1, wherein the check-back rate is a regular, repeating interval.

19. The gaming device of claim 7, wherein the flag data specifies at least one sound file change.

20. The gaming device of claim 19, wherein the sound file change includes at least one sound file specification.

21. The gaming device of claim 19, wherein the sound file change includes at least one beat specification.

22. The gaming device of claim 19, wherein the sound file change includes at least bar specification.

23. The gaming device of claim 1, wherein at least the first sound file is a sound recording having a plurality of beats per measure.

24. The gaming device of claim 1, wherein the second sound file is a sound recording having one beat.

25. An improved gaming device of the type in which: (a) at least one data processing means communicates with at least one memory device and at least one speaker; and (b) the data processing means plays a first sound file having a plurality of beats per unit time, wherein the improvement comprises:

game state data, a check-back rate, beat count data and a second sound file, whereby the data processing means uses the game state data, check-back rate and beat count data to interface said first sound file and said second sound file on one of the beats of the first sound file.

26. The gaming device of claim 25, wherein the check-back rate is a predetermined number of times that the data processing means reads game state data per unit time.

27. The gaming device of claim 25, wherein the game state data includes sound-event causing data.

28. The gaming device of claim 25, wherein the game state data includes flag data.

29. The gaming device of claim 25, wherein the memory device includes bar count data.

30. An improved gaming device of the type in which: (a) at least one data processing means communicates with at least one memory device and at least one speaker; and (b) the data processing means plays a first sound file having a plurality of beats per unit time, wherein the improvement comprises:

at least one check-back rate enabling such data processing means to interface a second sound file with the first sound file on one of the beats of the first sound file.

31. A method of operating a gaming device, comprising the steps of:

(a) providing a plurality of sound files;

(b) playing a first sound file having a plurality of beats per unit time;

(c) providing a predetermined number of ticks per unit time;

(d) reading game state data when each tick occurs;

(e) enabling at least one sound-causing event to occur; and (f) using a second sound file to produce at least one sound change on one of the beats of the first sound file.

32. The method of claim 31, wherein step (f) includes the step of conducting the file change when a tick occurs.

33. The method of claim 31, which includes the step of specifying when the file change shall occur.

34. The method of claim 33 which includes the step of conducting the file change according to such specification.

35. The method of claim 31, which includes the step of specifying on what beat the file change shall occur.

36. The method of claim 35 which includes the step of conducting the file change according to such specification.

37. The method of claim 31, which includes the step of specifying the bar at which the file change shall occur.

38. The method of claim 37 which includes the step of conducting the file change according to such specification.

39. The method of claim 31, wherein step (f) includes the step of interfacing a plurality of sound files.

40. The method of claim 31, wherein step (f) includes the step of switching a plurality of sound files.

41. The method of claim 31, wherein step (f) includes the step of playing a second sound file and stopping the play of the first sound file.

42. The method of claim 31, which includes the step of writing a check-back rate associated with such first sound file.

43. The method of claim 41, which includes the step of writing a check-back rate associated with such second sound file.

44. The method of claim 31, wherein step (e) includes the step of enabling a player to make a selection.

45. The method of claim 31, wherein step (e) includes the step of awarding a value to a player.

46. The method of claim 31, wherein step (e) includes the step of terminating a game.

47. The method of claim 31, wherein step (e) includes the step of emphasizing any game occurrence.

48. The method of claim 31, wherein step (f) includes the step of conducting a plurality of sound file changes on-beat.

49. A gaming device comprising:

data processing means;

at least one memory device in communication with said data processing means, said memory device storing a first sound file having a plurality of beats per unit time, a second sound file having at least one beat, event data and means for directing the data processing means to conduct periodic readings of the event data at a certain rate; and at least one speaker in communication with the data processing means, wherein the data processing means causes the speaker to produce the first sound file, conducts periodic readings of the event data, detects an event on one of said readings and causes the speaker to produce the second sound file on one of the beats of the first sound file.

50. The gaming device of claim 49, wherein said directing means includes instructions specifying said rate.

51. The gaming device of claim 49, wherein said directing means includes at least one rate specification.

52. The gaming device of claim 49, wherein a plurality of said readings coincide with a plurality of the beats of the first sound file.

53. The gaming device of claim 49, wherein the data processing means detects said event on a beat which is different than the beat on which the second sound file is played.

54. The gaming device of claim 49, wherein all of said readings coincide with all of the beats of the first sound file.

55. The gaming device of claim 49, wherein the data processing means detects said event on the beat on which the second sound file is played.

56. The gaming device of claim 49, wherein the beat on which the second sound file is played is a first beat following a bar in the first sound file.

57. The gaming device of claim 49, wherein the beat on which the second sound file is played is a predetermined beat within a measure in the first sound file.

58. The gaming device of claim 49, wherein the first sound recording is selected from the group consisting of a musical piece, a sound effect and a plurality of sound effects.

59. The gaming device of claim 49, wherein the second sound recording is selected from the group consisting of a musical piece, a sound effect and a plurality of sound effects.

60. The gaming device of claim 49, wherein the first sound recording has a tempo.

61. The gaming device of claim 60, wherein the tempo equals the rate at which the data processing means conducts the periodic readings of the event data.

62. The gaming device of claim 49, wherein the event data includes data associated with sound-causing events.

63. The gaming device of claim 49, wherein the event data includes data selected from the group consisting of data associated with a game start event, data associated with a value-winning event, data associated with a bonus triggering event, data associated with a player input event, data associated with a game termination event and data associated with a gaming device attract mode event.

64. The gaming device of claim 49, wherein the memory device stores beat count data.

65. The gaming device of claim 49, wherein the memory device stores bar count data.

66. The gaming device of claim 49, wherein the memory device stores music code.

67. The gaming device of claim 49, wherein the memory device stores musical metronome code.

68. The gaming device of claim 49, wherein the processor interfaces the first sound file and the second sound file on one of the beats of the first sound file.

69. The gaming device of claim 68, wherein the interfacing is selected from the group consisting of playing, mixing, transitioning, switching, replacing, combining, splicing, overlaying and joining.

70. A gaming device comprising:

data processing means;

at least one memory device in communication with said data processing means, said memory device storing a first sound file having a plurality of beats per unit time, a second sound file having at least one beat, event data and means for directing the data processing means to conduct periodic readings of the event data coinciding with the beats of the first sound file; and at least one speaker in communication with the data processing means, wherein the data processing means causes the first sound file to be played, conducts readings of the event data on each beat of the first sound recording, detects an event on one of said readings and causes the second sound file to be played on one of the beats of the first sound file.

71. The gaming device of claim 70, wherein said directing means includes instructions specifying said rate.

72. The gaming device of claim 70, wherein said directing means includes at least one rate specification.

73. The gaming device of claim 70, wherein the beat on which the second sound file is played is a first beat following a bar in the first sound file.

74. The gaming device of claim 70, wherein the beat on which the second sound file is played is a predetermined beat within a measure in the first sound file.

75. The gaming device of claim 70, wherein the first sound recording is selected from the group consisting of a musical piece, a sound effect and a plurality of sound effects.

76. The gaming device of claim 70, wherein the second sound recording is selected from the group consisting of a musical piece, a sound effect and a plurality of sound effects.

77. The gaming device of claim 70, wherein the first sound recording has a tempo.

78. The gaming device of claim 70, wherein the tempo equals a rate at which the data processing means conducts the periodic readings of the event data.

79. The gaming device of claim 70, wherein the event data includes data associated with sound-causing events.

80. The gaming device of claim 70, wherein the event data includes data selected from the group consisting of data associated with a game start event, data associated with a value-winning event, data associated with a bonus triggering event, data associated with a player input event, data associated with a game termination event and data associated with a gaming device attract mode event.

81. The gaming device of claim 70, wherein the memory device stores beat count data.

82. The gaming device of claim 70, wherein the memory device stores bar count data.

83. The gaming device of claim 70, wherein the memory device stores music code.

84. The gaming device of claim 70, wherein the memory device stores musical metronome code.

85. The gaming device of claim 70, whereby the processor interfaces the first sound file and the second sound file on one of the beats of the first sound file.

86. The gaming device of claim 85, wherein the interfacing is selected from the group consisting of playing, mixing, transitioning, switching, replacing, combining, splicing, overlaying and joining.

87. A gaming device comprising:

at least one processor;

at least one speaker in communication with the processor; and at least one memory device in communication with said processor, said memory device storing a plurality of sound files, event data and means for directing the processor to play one of the sound recordings and cause an on-beat transition from the sound recording being played to a different sound recording.

88. The gaming device of claim 87, wherein said directing means includes instructions specifying a check-back rate.

89. The gaming device of claim 87, wherein said directing means includes at least one check-back rate specification.

90. The gaming device of claim 87, wherein at least one of the sound recordings is selected from the group consisting of a musical piece, a sound effect and a plurality of sound effects.

91. The gaming device of claim 87, wherein the first sound recording has a tempo.

92. The gaming device of claim 91, wherein the tempo equals a rate at which the processor conducts periodic readings of the event data.

93. The gaming device of claim 87, wherein the event data includes data associated with sound-causing events.

94. The gaming device of claim 87, wherein the event data includes data selected from the group consisting of data associated with a game start event, data associated with a value-winning event, data associated with a bonus triggering event, data associated with a player input event, data associated with a game termination event and data associated with a gaming device attract mode event.

95. The gaming device of claim 87, wherein the memory device stores beat count data.

96. The gaming device of claim 87, wherein the memory device stores bar count data.

97. The gaming device of claim 87, wherein the memory device stores music code.

98. The gaming device of claim 87, wherein the memory device stores musical metronome code.

99. A gaming device comprising:

data processing means;

at least one memory device in communication with said data processing means, said memory device storing a first sound file having a first tempo, a second sound file having a second tempo, event data and means for directing the data processing means to conduct periodic readings of the event data at a rate equal to the first tempo; and at least one speaker in communication with the data processing means, wherein the data processing means causes the first sound file to be played at the first tempo, conducts readings of the event data, detects an event on one of said readings, causes an on-beat transition from the first sound file to the second sound file and causes the second sound file to be played at the second tempo.

100. The gaming device of claim 99, wherein said directing means includes instructions specifying said rate.

101. The gaming device of claim 99, wherein said directing means includes at least one rate specification.

102. The gaming device of claim 99, wherein the first sound recording is selected from the group consisting of a musical piece, a sound effect and a plurality of sound effects.

103. The gaming device of claim 99, wherein the second sound recording is selected from the group consisting of a musical piece, a sound effect and a plurality of sound effects.

104. The gaming device of claim 99, wherein the event data includes data associated with sound-causing events.

105. The gaming device of claim 99, wherein the event data includes data selected from the group consisting of data associated with a game start event, a value-winning event, a bonus triggering event, a player input event, a game termination event and a gaming device attract mode event.

106. A method of operating a gaming device, comprising the steps of:

(a) periodically conducting readings of event data at a certain rate;

(b) detecting a first event on one of said readings;

(c) playing a first sound file having a plurality of beats per unit time;

(d) detecting a second event on one of said readings; and (e) playing a second sound file on one of the beats of the first sound file.

107. The method of claim 106, wherein step (a) includes the step of periodically conducting readings of event data at a rate equal to the beats per unit time of the first sound file.

108. The method of claim 106, wherein step (e) includes the step of specifying on which beat of the first sound file the second sound file will be played.

109. The method of claim 106, which includes the step of stopping the play of the first sound file after the second sound file is played.

110. The method of claim 106, which includes the step of simultaneously playing the first sound file and the second sound file.

* * * * *